Dec. 27, 1966  G. C. WOOD  3,294,406
MILL MIXER AND SPREADER WITH DISPLACEABLE TOP
Filed May 12, 1964
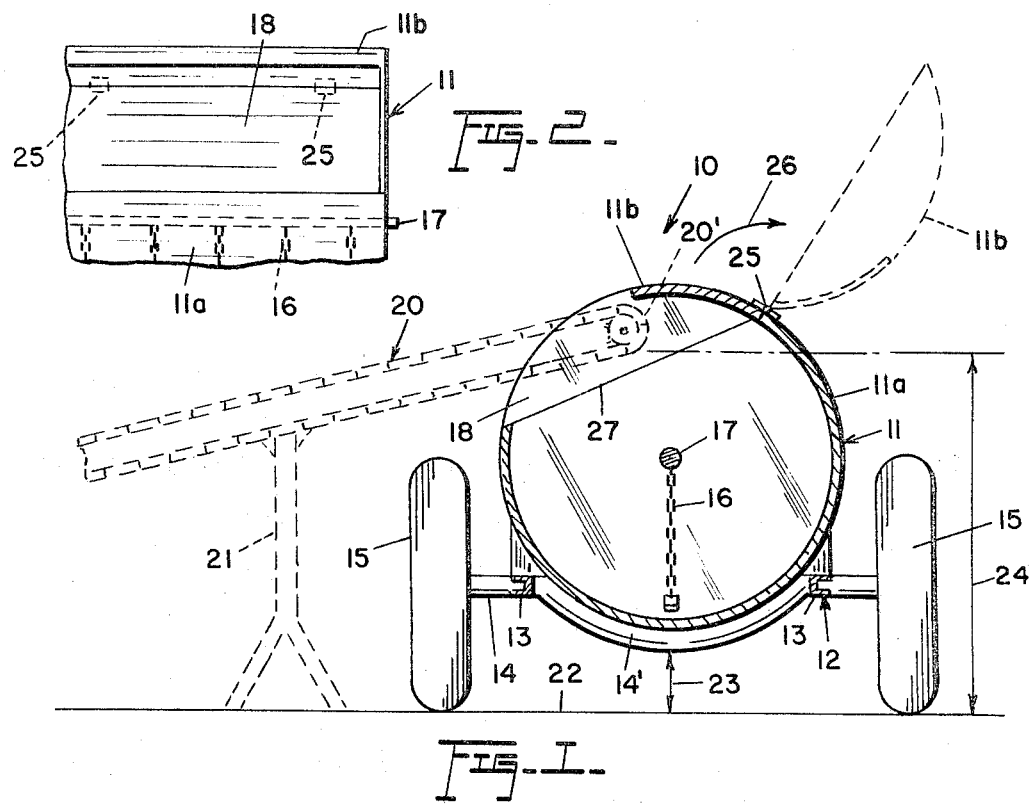
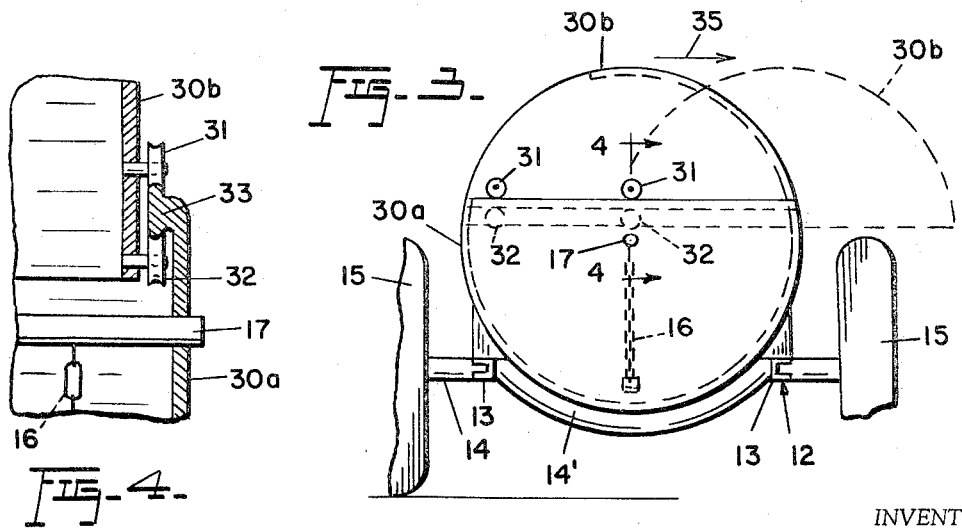
INVENTOR
GEORGE C. WOOD
BY *Munson H. Lane*
ATTORNEY United States Patent Office 3,294,406
Patented Dec. 27, 1966

3,294,406
MILL MIXER AND SPREADER WITH
DISPLACEABLE TOP
George C. Wood, % Darf Corporation, Edenton, N.C.
Filed May 12, 1964, Ser. No. 366,745
1 Claim. (Cl. 275—3)

This invention relates to new and useful improvements in portable milling, mixing and spreading apparatus for material such as silage, manure, et cetera, the apparatus being of the general type which comprises a wagon-mounted housing containing a rotatable beater unit whereby material in the housing is broken up, mixed and ultimately discharged through a lateral opening with which the housing is provided.

It is customary for the housing of an apparatus of this type to be loaded with material by an endless conveyor extending from a pile of manure adjacent a barn, or from the outlet of a silo, and inasmuch as the discharge end of such a conveyor has a limited maximum elevation above the ground, difficulties are frequently encountered in attempts to maneuver the apparatus under the discharge end of the conveyor without interference between the conveyor and the housing and possible damage to either or both. In order to avoid such interference and possible damage it has been customary to construct the apparatus small enough for the housing thereof to fit under the discharge end of the conveyor with some degree of clearance, but such practice has unduly restricted the practical size of the apparatus as well as its capacity in terms of the quantity of material handled in a single load.

It is, therefore, the principal object of this invention to eliminate the disadvantages above outlined by an arrangement of the apparatus which permits a material housing of an optimum size to be utilized with ample clearance within the limited maximum elevation of the conveyor, so that the apparatus may be positioned under the conveyor, its housing loaded, and the apparatus removed, without any interference between the conveyor and the housing.

With the above more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a vertical cross-sectional view of the apparatus of the invention, also showing its relationship to a loading conveyor illustrated by dotted lines;

FIGURE 2 is a fragmentary side elevational view of the apparatus shown in FIGURE 1;

FIGURE 3 is a fragmentary end elevational view of a modified embodiment of the invention; and FIGURE 4 is an enlarged, fragmentary sectional detail, taken substantially in the plane of the line 4—4 in FIGURE 3.

Referring now to the accompanying drawings in detail, more particularly to FIGURES 1 and 2, the general reference numeral 10 designates a milling, mixing and spreading apparatus for material such as silage, manure, or the like, the apparatus comprising a substantially cylindrical housing 11 which is mounted in a horizontal position on a suitable wagon or chassis 12, adapted to be drawn by a tractor, or the like. The chassis 12 may include a pair of spaced side members 13 and a transverse axle 14, the latter being provided at the ends thereof with travelling wheels 15. Provided inside the housing 11 is a rotatable beater unit 16 supported by a drive shaft 17 journalled axially in the housing. In accordance with conventional practice, the shaft 17 may be driven from the power take-off of the tractor by which the chassis 12 is drawn.

The housing 11 is provided at one side of its upper region with an outlet opening 18, through which material milled and mixed in the housing by the beater unit 16 is discharged. As shown, such discharge of material is directed to one side of the chassis, although this is immaterial to the principles of the present invention inasmuch as the material may alternatively be discharged to the rear of the chassis, depending upon the position of the axis of rotation of the beater unit. In any event, before operation of the apparatus may be undertaken, it is necessary to load the material into the housing 11, this being usually done by a conveyor such as a power-driven, endless conveyor, which is indicated in FIGURE 1 by the dotted lines 20 and extends from a suitable material source (not shown), such as a pile of manure adjacent a barn, or the outlet of a silo. The conveyor 20 is usually supported by a support 21 which may or may not be adjustable, but in either instance, there is a maximum limit to which the outer or discharge end 20' of the conveyor can be raised above the ground level 22. Inasmuch as there has to be a reasonable clearance 23 between the axle 14 and the ground so as to enable the machine to travel over uneven ground terrain, and inasmuch as the maximum elevation of the conveyor discharge end 20' is limited to the vertical distance 24 which cannot be increased without adding to or otherwise altering the conventional conveyor structure, it has heretofore been the practice to construct the housing 11 of a diameter small enough so that the top of the housing would not interfere with the discharge end of the conveyor when the apparatus was brought into position under the conveyor for loading. Such a practice, of course, has resulted in making the diameter of the housing relatively small, with a correspondingly small material capacity of the housing for a single load.

The invention eliminates this difficulty by two structural improvements, one of which involves the provision of a downwardly bowed intermediate portion 14' in the axle 14 between the side members 13 of the chassis 12, the axle portion 14' permitting the bottom region of the housing 11 to fit thereinto, without unduly raising the housing as a whole above the axle, so that in effect, the vertical distance from the ground to the top of the housing is materially reduced.

Secondly, the invention provides for construction of the housing 11 in two parts, namely, a lower, main body portion 11a which is fixedly mounted on the chassis 12, and an upper portion 11b which, as a segment of the housing complemental to the lower portion, is hingedly connected as at 25 to the lower portion at one side of the housing, so that the upper portion 11b may be swung upwardly and laterally as indicated by the arrow 26 to an out-of-the-way position shown by the dotted lines 11b', wherein it does not interfere with the conveyor 20. Thus, when the upper housing portion 11b is in the out-of-the-way position as at 11b', the apparatus may be moved into position under the discharge end 20' of the conveyor, material from the conveyor may be discharged into the housing, and the apparatus subsequently moved away, all without any interference between the housing and the conveyor while maintaining the size of the housing, and its material capacity, at optimum.

While the upper housing portion 11b may comprise both the upper circumferential region as well as the two end segments of the housing as a unit, the circumferential region and the two end segments may be separately hinged. In such event, the circumferential region would be hinged by the hinges 25 as already noted, but the end segments would be hinged separately at the separation line 27 between the upper and lower portions of the housing.

FIGURES 3 and 4 illustrate a modified embodiment of the invention wherein the upper portion 30b of the housing 30 is slidably positioned on the lower housing portion 30a, so that the upper portion may be moved laterally to an out-of-the-way position indicated at 30b' to provide clearance for the loading conveyor. To facilitate the sliding movement of the upper housing portion on the lower portion, the end walls of the upper portion 30b are preferably provided with pairs of rollers 31, 32, which engage a bead or track 33 formed at the upper edge of each of the end walls of the lower housing section 30a, as is best shown in FIGURE 4. Thus, as illustrated in FIGURE 3, the arrangement permits the upper housing section 30b to be shifted laterally in the direction of the arrow 35 to an out-of-the-way position to permit loading of the housing without interference with the conveyor.

While in the foregoing there has been described and shown the preferred arrangement of the invention, various modifications and equivalents may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

A portable material milling, mixing and spreading apparatus adapted to be loaded with material by loading means having a limited maximum elevation above the ground, said apparatus comprising a chassis having ground engaging wheels supporting the same, a substantially cylindrical housing mounted horizontally on said chassis with its longitudinal axis parallel to the plane of rotation of said wheels, said housing comprising a substantially semi-cylindrical lower housing portion fixed to said chassis and a segmentally complemental top portion, said lower housing portion including a pair of substantially semi-circular end walls having horizontally straight upper edges provided integrally with inwardly projecting horizontal beads, said beads having upper and lower edges of a convex cross-section constituting upper and lower tracks, said complemental top portion of said housing including a pair of segment-shaped end walls disposed inwardly of said beads of the lower housing portion, upper and lower pairs of concave rollers rotatably mounted exteriorly on lower regions of the end walls of said top portion, said upper and lower pairs of rollers rollingly engaging the respective upper and lower tracks of said beads whereby the top portion of the housing may be slid from its complemental position on the lower housing portion horizontally laterally to a loading position at one side of the longitudinal axis of the housing wherein the top of the lower housing portion at the other side of the longitudinal axis is open, and a material beater unit operative in said housing, said beater unit including a shaft journalled in the end walls of the lower housing portion below said beads, the size of said chassis and housing being such that the housing top portion projects above the aforesaid maximum elevation of the loading means but upon sliding of the housing top portion to the loading position the apparatus may be wheeled under the loading means for delivery of material into the partially open top of the lower housing portion.

References Cited by the Examiner

UNITED STATES PATENTS

| 2,952,465 | 9/1960 | Skromme | 172—45 X |
| 3,105,693 | 10/1963 | Ferris | 275—3 |
| 3,121,568 | 2/1964 | Wilkes et al. | 275—3 |

FOREIGN PATENTS 427,633   4/1926   Germany.

ABRAHAM G. STONE, *Primary Examiner.*

WILLIAM A. SMITH III, *Examiner.*